(12) United States Patent
Purdy

(10) Patent No.: US 6,191,799 B1
(45) Date of Patent: Feb. 20, 2001

(54) METHOD APPARATUS AND COMPUTER-READABLE MEDIUM FOR ALTERING THE APPEARANCE OF AN ANIMATED OBJECT

(75) Inventor: D. Gray Purdy, Incline Village, NV (US)

(73) Assignee: Quid Novi, S.A., Incline Village, NV (US)

(*) Notice: Under 35 U.S.C. 154(b), the term of this patent shall be extended for 0 days.

(21) Appl. No.: 09/131,079

(22) Filed: Aug. 7, 1998

(51) Int. Cl.[7] .................................................... G06T 15/00
(52) U.S. Cl. ................................................................ 345/473
(58) Field of Search .................................. 345/472, 473, 345/474, 418

(56) References Cited

U.S. PATENT DOCUMENTS

| | | |
|---|---|---|
| 4,344,145 | 8/1982 | Chasek . |
| 4,628,470 | 12/1986 | Baumann . |
| 4,847,785 | 7/1989 | Stephens . |
| 5,058,009 | 10/1991 | Yoshino et al. . |
| 5,245,535 | 9/1993 | Weiss et al. . |
| 5,347,452 | 9/1994 | Bay, Jr. . |
| 5,371,842 | 12/1994 | Easton et al. . |
| 5,485,600 | 1/1996 | Joseph et al. . |
| 5,590,325 | 12/1996 | Kolton et al. . |
| 5,615,323 | 3/1997 | Engel et al. . |
| 5,684,508 | 11/1997 | Brilman . |
| 5,987,432 | * 11/1999 | Zusman et al. ...................... 705/35 |

FOREIGN PATENT DOCUMENTS

WO 95/24114    9/1995  (WO) .

OTHER PUBLICATIONS

David Turo and Brian Johnson, "Improving the Visualization of Hierarchies with Treemaps: Design Issues and Experimentation," Proceedings of the Visualization Conference '92, Oct. 19–23, 1992, Boston, Massachusetts, IEEE Computer Society Press, 1992.

* cited by examiner

*Primary Examiner*—Cliff N. Vo
(74) *Attorney, Agent, or Firm*—Christensen O'Connor Johnson Kindness PLLC

(57) ABSTRACT

A data animation program (11) is provided that alters the appearance of an animated object (39) to reflect a percentage change in data represented by the animated object. The data is provided to the data animation program by a data source (20) such as a temperature sensor or an Internet web site. The percentage change in data is converted to a rate of motion for the animated object. The appearance of the animated object is then altered in accordance with the rate of motion. For example, if the animated object is a propeller, the rate of motion will be expressed in revolutions per minute (RPMs) and the propeller then spins at the determined rate of motion so as to indicate the percentage change in data represented by the animated object.

29 Claims, 10 Drawing Sheets

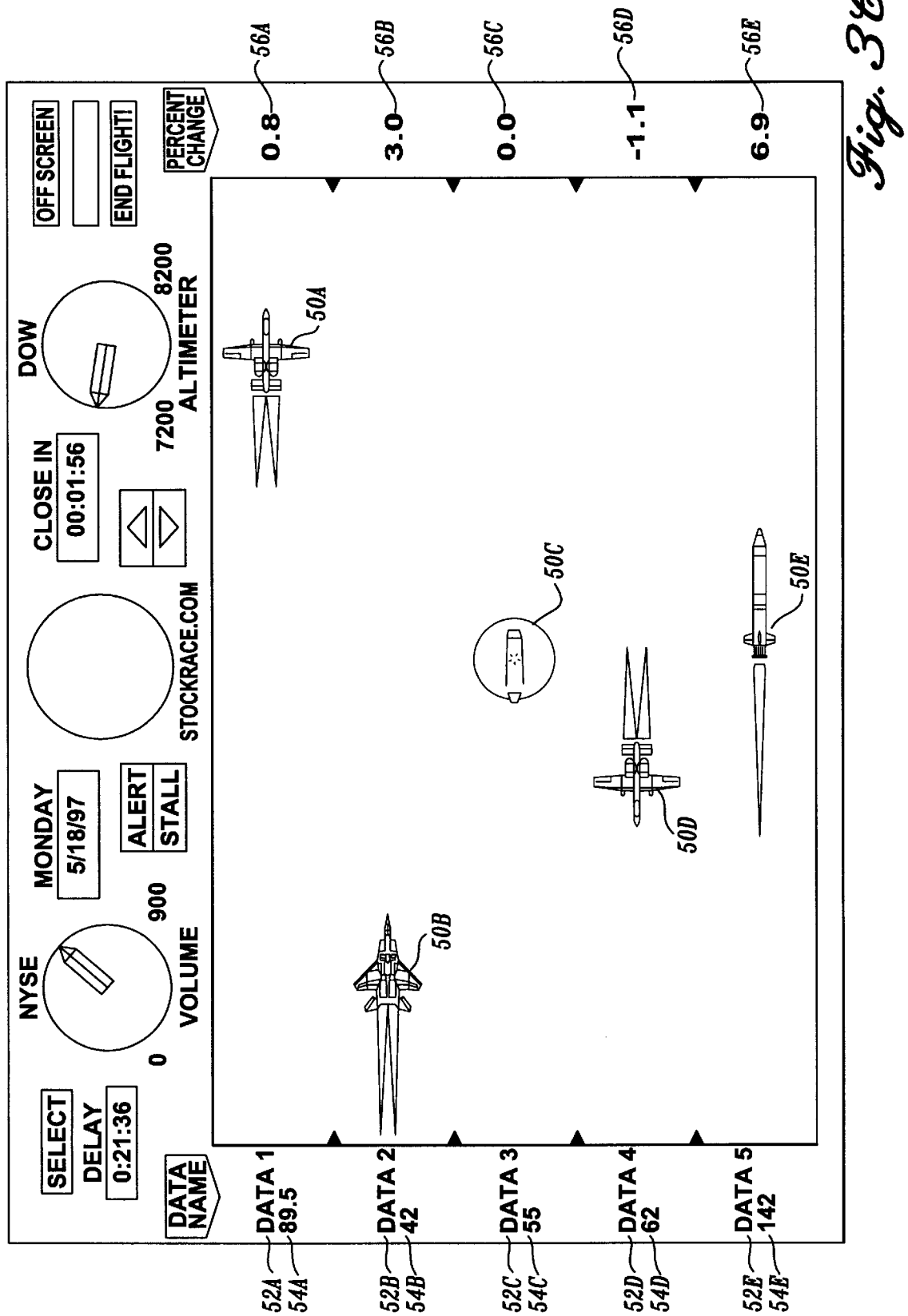

METHOD APPARATUS AND COMPUTER-READABLE MEDIUM FOR ALTERING THE APPEARANCE OF AN ANIMATED OBJECT

FIELD OF THE INVENTION

This invention generally relates to a method and apparatus for graphically representing data as an animated object, and more particularly to a method and apparatus for altering the appearance of an animated object to reflect a rate of change in the data being represented by the animated object.

BACKGROUND OF THE INVENTION

With the advent of computers and computer networks, including the Internet, massive quantities and types of data have become available to computer users. Computer users may now obtain virtually any type of data in any quantity from virtually any data source. However, the challenge is in assimilating and presenting the data obtained in a meaningful manner to the computer user.

Clearly, the types, quantities, and sources of data available to computer users are virtually without limit. However, one specific example of available data that is particularly illustrative of the type with which the present invention may be used is financial market data. Financial market data includes any and all market information, current or historical, such as: the trading prices and volumes of stocks, bonds, stock funds, bond funds, market indices, commodities, commodity indices, monetary exchange rates, and any other market trading data. Investors have long had at their disposal voluminous amounts of textual and numerical financial market data. They have even been able to view such data graphically, such as with a bar graph, line diagram or pie chart. However, such graphical displays of data still have drawbacks in that they do not necessarily convey to the investor an immediate sense of how quickly the price or volume of a particular stock may be changing or trading at any given instant. Consequently, the investor is required to perform more mental calculation than she would like in order to obtain the desired information.

To solve the foregoing and other shortcomings in the prior art, a method and apparatus are needed for graphically representing data to a user in a manner that immediately and visually conveys to the user changes to the data. The method and apparatus should assimilate data quickly and easily, and should be capable of representing a plurality of data values and/or types simultaneously. As explained in the following, the present invention provides a method and apparatus that meets these criteria and solves other problems in the prior art.

SUMMARY OF THE INVENTION

The present invention provides a data animation program for altering the appearance of an animated object which graphically represents data. The data animation program alters the appearance of the animated object by determining a rate of alteration for the animated object based on a change in the data which is represented by the animated object, and altering the appearance of the animated object in accordance with the rate of alteration for the animated object. For example, if the animated object is a propeller representing the price of a particular stock on the New York Stock Exchange, the data animation program determines a rate of motion for the propeller expressed in revolutions per minute (RPMs) based on a percentage change in the stock price and then causes the propeller to rotate at the determined rate of motion.

The data animation program determines the rate of alteration for an animated object by determining a rate of alteration factor as a function of a maximum rate of alteration allowed for the animated object and a maximum percentage change allowed in data and calculating the rate of alteration for the animated object as a function of the rate of alteration factor and the percentage change in data.

In accordance with other aspects of the present invention, if the rate of alteration for the animated object exceeds the maximum rate of alteration, the data animation program alters the appearance of the animated object to indicate that the maximum percentage change in data allowed has been exceeded. For example, if the rate of alteration for the animated object is too great, the animated object may be made to blink or change color. Conversely, if there is no change in the data represented by the animated object, the data animation program does not alter the appearance of the animated object, e.g., the animated object remains fixed.

In accordance with yet other aspects of the present invention, the data animation program displays and alters multiple animated objects simultaneously, transfers altered animated objects to other users, and alters animated objects at periodic intervals.

A method and an apparatus capable of performing actions generally consistent with the data animation program described above represent further aspects of the present invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3C depicts an alternative representation of a plurality of animated objects displayed simultaneously in accordance with the present invention;

DETAILED DESCRIPTION OF THE PREFERRED EMBODIMENT

Figure 1:
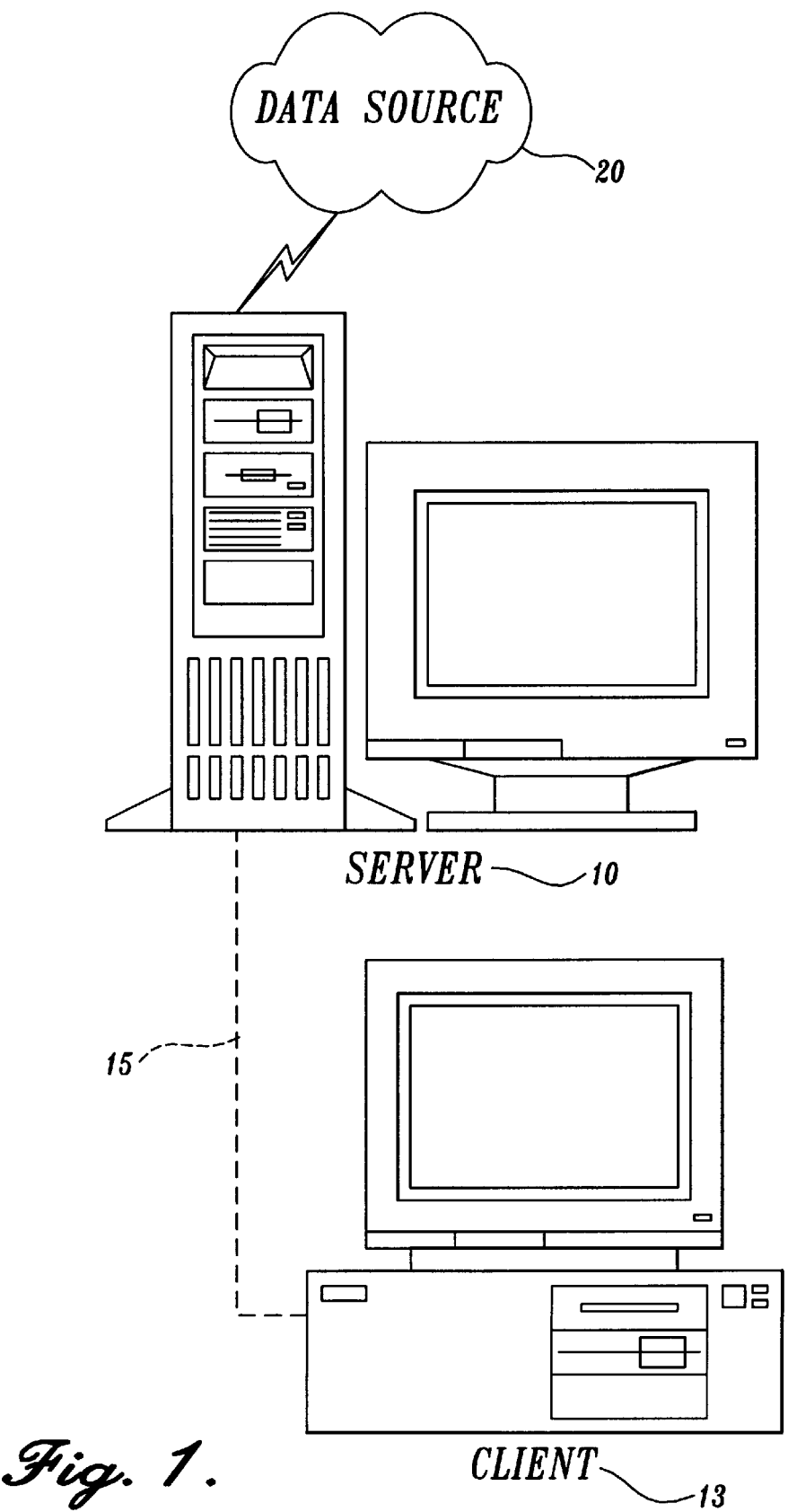
FIG. 1 is a pictorial diagram of a server which alters the appearance of an animated object representing certain data provided by a data source and transmits the altered animated object to a client for display in accordance with the present invention.

FIG. 1 depicts a client/server environment in which the present invention of altering the appearance of an animated object representative of particular data is used. In accordance with the present invention a server computer 10 receives data from a data source 20 which is used to alter the appearance of an animated object representing that data. The data source 20 may be any device, program, database or other entity capable of collecting and storing data and communicating data to the server 10. The data source 20 may be a local data source, such as a heat sensor connected directly to the server 10, a file stored in memory of the server, or a user entering data to server memory using a keyboard. On the other hand, the data source 20 may be a remote data source in communication with the server 10 via an intranetwork or an internetwork, such as the Internet. Accordingly, the data received by the server 10 and represented by an animated object in accordance with the present invention may be of any conceivable type or nature capable of being represented by an animated object. Some practical examples include temperature data collected by the heat sensor mentioned above or New York Stock Exchange (NYSE) stock information available from an Internet web site (i.e., a server connected to the Internet which has mass storage facilities for storing hypertext documents and which runs administrative software for handling those hypertext documents). As will be described in more detail below, the server alters the appearance of the animated object, e.g., by rotating the object or passing it across a display, as the data represented by the animated object and provided by the data source 20 changes. Accordingly, the user is given an immediate visual, and perhaps aural or interactive, indication of how the data in which the user is interested is changing.

In one embodiment of the present invention, the server 10 transfers the altered animated object to a client computer 13 whose user is interested in the data represented by that animated object over a remote connection 15. The client 13 then displays the animated object as provided by the server. The client 13 may be connected to the server 10 via an intranetwork (i.e. a LAN), an internetwork (i.e., the Internet) or remotely via a modem. However, it will be appreciated that in other embodiments of the present invention, the server 10 does not transfer the animated object to a client 13 for display. Instead, the server 10 alters the appearance of the animated object and displays the animated object itself.

Figure 2A:
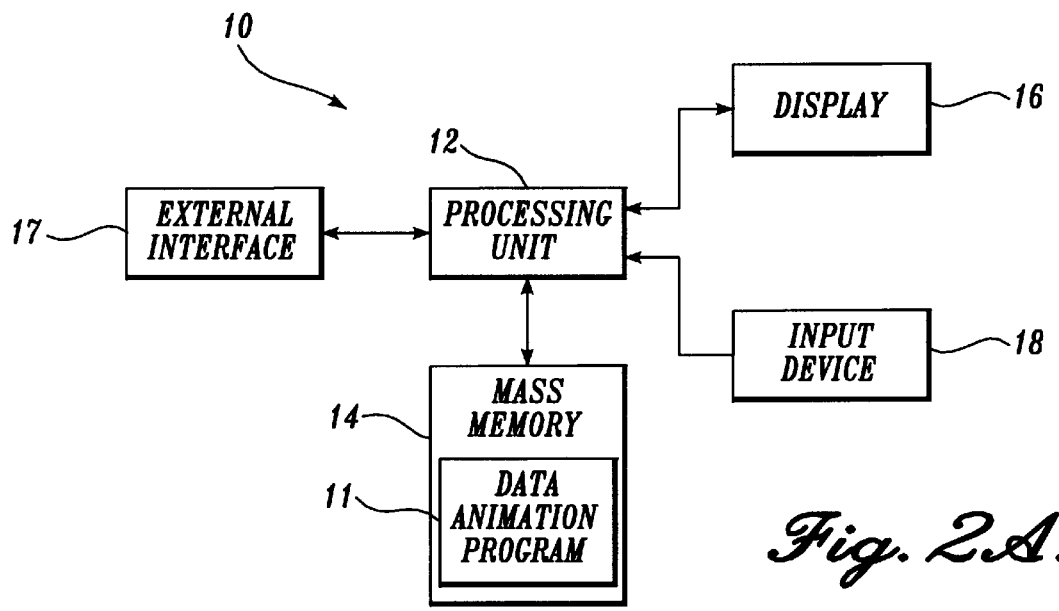
FIG. 2A is a block diagram of the several components of the server shown in FIG. 1 that are used to alter the appearance of the animated object in accordance with the present invention.

FIG. 2A depicts several of the key components of the server 10 used to implement the present invention. Those of ordinary skill in the art will appreciate that the server 10 includes many more components than those shown in FIG. 2A. However, it is not necessary that all of these generally conventional components be shown in order to disclose an illustrative embodiment for practicing the present invention. As shown in FIG. 2A, the server 10 includes a processing unit 12, a display 16 and a mass memory 14. Mass memory 14 generally comprises a random access memory (RAM), read only memory (ROM), and a permanent mass storage device, such as a hard disk drive, tape drive, optical drive, floppy disk drive, or a combination thereof. The mass memory 14 stores the program code and data necessary for altering and displaying animated objects in accordance with the present invention. More specifically, the mass memory 14 stores a data animation program 11 formed in accordance with the present invention for altering the appearance of an animated object with data provided by the data source 20.

The server 10 also includes an input device 18 and an external interface 17. The input device 18 may be implemented by a user of the server 10 to input data and default values to the data animation program 11. The input device may be of any conventional type such as a keyboard, mouse, track-ball, etc. The server 10 communicates to the client 13 and receives data from the data source 20 through the external interface 17. In one actual embodiment of the present invention, the server is connected to a local area network, which in turn is connected to the Internet. Thus, the external interface 17 comprises a network interface card including the necessary circuitry for such a connection. The external interface 17 is also constructed for use with the Transmission Control Protocol/Internet Protocol (i.e., the standard transmission protocol for the Internet, also known as "TCP/IP"), the particular network configuration of the local area network it is connecting to, and a particular type of coupling medium. In other embodiments of the present invention, the external interface 17 comprises a modem.

Figure 2B:
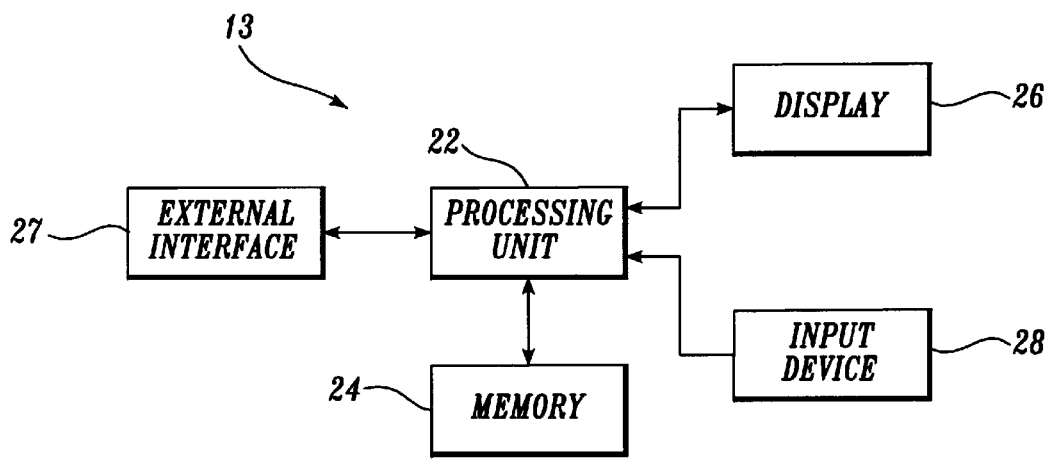
FIG. 2B is a block diagram of the several components of the client shown in FIG. 1 that are used to display the animated object altered by the server in accordance with the present invention.

As noted above, the server 10 transmits the altered animated object to the client 13 via a remote connection 15 established by the external interface 17. The key components of the client 13 used to display the animated object are shown in FIG. 2B. Again, those of ordinary skill in the art will appreciate that the client 13 includes many more components than those shown in FIG. 2B. However, it is not necessary that all of these generally conventional components be shown in order to disclose an illustrative embodiment for practicing the present invention. The client 13 communicates with the server 10 over a remote connection 15, via an external interface 27. In the actual embodiment of the present invention described herein, the client 13 is connected to a local area network, which in turn, in connected to the Internet. Accordingly, external interface 27 includes the necessary circuitry for such a connection, and is also constructed for use with the TCP/IP protocol, the particular network configuration of a local area network it is connecting to, and a particular type of communication medium. In another embodiment of the present invention, the client's external interface 27 is a modem through which the client 13 may contact the server 13 directly.

In addition to the external interface 27, the client computer 13 includes a display 26, a memory 24 and a processing unit 22. The memory 24 generally comprises a random access memory (RAM), a read-only memory (ROM) and a permanent storage device, such as a disk drive. The memory stores the altered animated object provided by the server 10 and the program code implemented by the processing unit 22 for presenting the animated object on the display 26.

Finally, the client 13 includes an input device 28, which may be implemented by a user to input or modify default values to the data animation program 11, select animated objects for display and initiate connection to the server 10. The input device 28 may be of any conventional type, such as a keyboard, mouse, track-ball, etc.

Figure 3A:
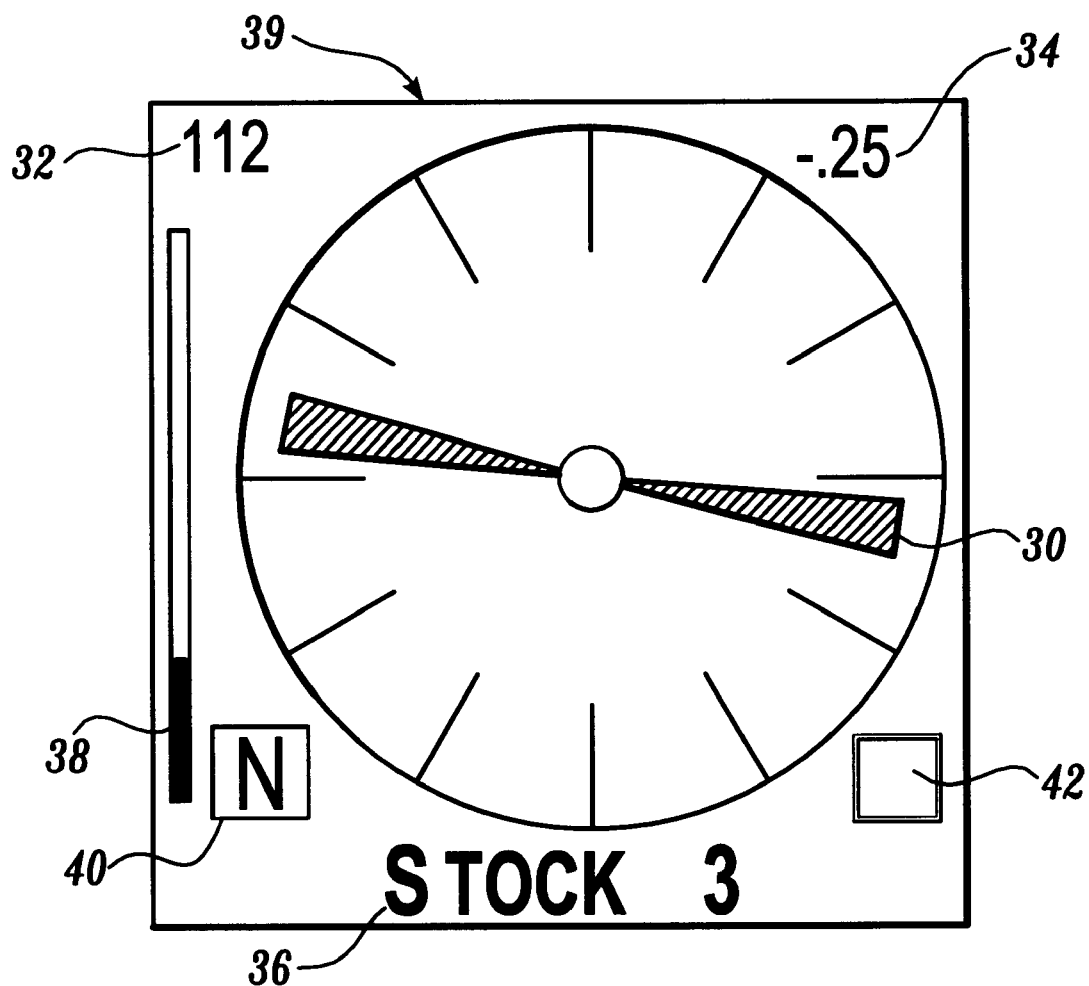
FIG. 3A depicts a representative animated object whose appearance is altered and displayed in accordance with the present invention.

FIG. 3A illustrates a representative animated object produced and displayed by the data animation program 11 in one actual embodiment of the present invention. An animated object is a visual image generated using programming code. In some embodiments the animated object may also include aural and/or interactive characteristics. An animated object may actually refer to several frames of visual display information, and not one solitary visual image. In typical animation, as many frames of animation are displayed in succession, the appearance of the animated object is altered. For example, the dynamic appearance of motion and speed may be created in the animated object or the shape, size, color, etc. of the animated object may change. In computer animation, the appearance of the animated object is altered by direct manipulation of the object using programming code. It is a description of the dynamic alteration in appearance of the animated object that is necessary for understanding of the present invention, not exactly how this appearance is created using computer or other animation techniques, which are well-known in the art. Consequently, the animation techniques, including computer animation techniques, used to generate and alter animated objects in accordance with the present invention need not be described in further detail herein. However, as will be described in more detail below, the present invention takes advantage of the dynamic alteration in appearance of animated objects to immediately convey to a user changes in data represented by the object.

Returning to FIG. 3A, the animated object depicted is a propeller object 39 used to graphically represent the price of a particular stock obtained from the NYSE. It will be appreciated that in this example the data source 20 is a satellite link connected to the server 10. In the depicted embodiment, the propeller object 39 includes a propeller 30 which rotates about a center axis. In accordance with the present invention, the appearance of the propeller object 39 will be altered, i.e., the propeller 30 will rotate about its center axis at a rate determined by the data animation program 11, as the price of the stock represented by the propeller object charges. More specifically, the propeller 30 rotates about its center axis at a rate which is indicative of the percentage change in stock price between the starting price of the stock and the current price of the stock. How the data animation program 11 calculates the percentage change and rate of rotation are described in more detail below. If the percentage change in stock price is positive, the propeller rotates at the determined rate in a clockwise direction. If the percentage change in stock price is negative, the propeller rotates in a counter-clockwise direction at the determined rate. If the percentage change in stock price is zero, the propeller stays in a fixed position until a non-zero percentage change is detected.

In addition to the rotation of the propeller 30 to indicate the rate of change in stock price, related textual information may be displayed. For example, as can be seen in FIG. 3A, the current stock price 32 is displayed just above and to the left of the propeller 30. The change in stock price 34 from the starting stock price at the beginning of trading to the current stock price is displayed above and to the right of the propeller 30. In one actual embodiment of the present invention, the change in stock price is one color, e.g., green, for a positive change and another color, e.g., red, for a negative change in stock price. A name 36 of the stock being monitored is centered immediately below the propeller 30, while, a related volume indicator 38 is displayed immediately to the left of the propeller 30. The volume indicator 38 graphically represents the volume of the stock traded. Below and to the left of the propeller 30, and represented by an 'N' in FIG. 3A, is a hyperlink 40 (i.e., a highlighted portion of text which links the animated object to another hypertext document possibly stored at a web site on the Internet). Below and to the right of the propeller 30 is a hi-low indicator 42. The hi-low indicator is a warning light which turns one color, e.g., green, if the stock met or exceeded a preset high value, and it turns another color, e.g., red, for meeting or dropping below a preset low value.

Figure 3B:
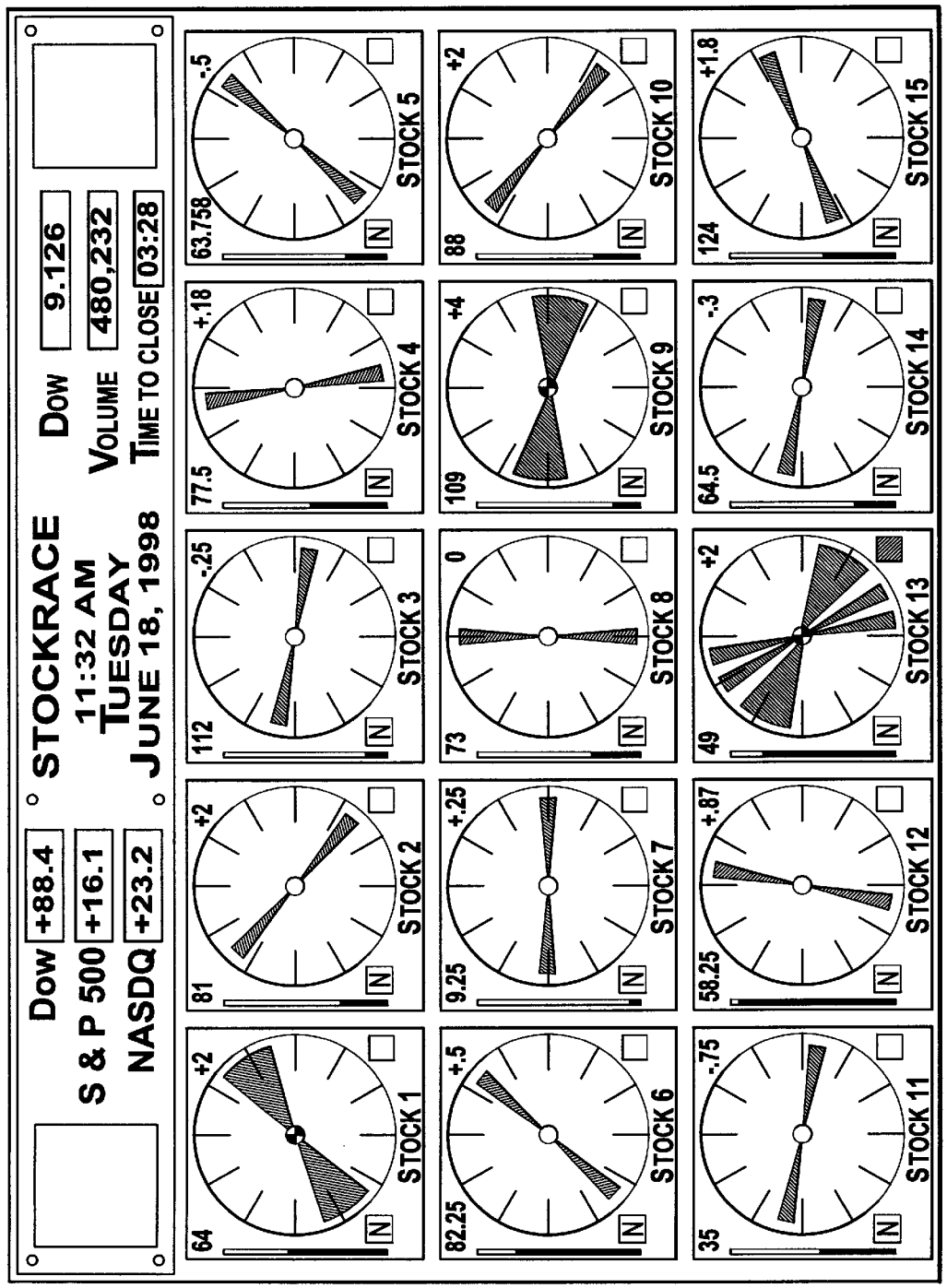
FIG. 3B depicts a plurality of animated objects displayed simultaneously in accordance with the present invention.

FIG. 3B depicts an embodiment of the present invention in which a plurality of the propeller objects 39 shown in FIG. 3A are displayed simultaneously. It will be appreciated from FIG. 3B that each individual propeller object 39 represents a different stock and that each propeller object occupies its own dedicated area on the client's display 26.

FIG. 3C is another example of how a plurality of animated objects may be displayed simultaneously. In the embodiment shown in FIG. 3C, each particular stock is represented by an animated aviation object 50A, 50B, 50C, 50D or 50E, which moves horizontally across the client's display 26 at a rate of motion, e.g., screen passes per minute, determined by the data animation program 11 based on a percentage change in price of the stock represented by the aviation object. Since the percentage change in stock price may be either positive or negative, the corresponding rate of motion for each aviation object may be positive or negative. Accordingly, each aviation object may move in a forward or backward direction.

Textual information about the stock represented by each aviation object is also shown in FIG. 3C. For example, the name 52A, 52B, 52C, 52D and 52E and current stock price 54A, 54B, 54C, 54D and 54E of each stock appears to the left of each corresponding aviation object. The change 56A, 56B, 56C, 56D and 56E in stock price appears opposite the current stock price on the right of each aviation object.

It will be appreciated from FIGS. 3B and 3C that by altering the appearance of the animated object, e.g. by rotating a portion of the object or passing the object across the screen, the user is given an immediate visual (and perhaps aural or interactive) indication of the rate at which the data represented by the animated object is changing. When more than one animated object is displayed simultaneously, the user is given an immediate indication of how different data values are performing relative to one another. In the stock example depicted in FIG. 3C in which aviation objects are used to represent various stock prices, the user knows at a glance which stock is increasing the fastest, and which the slowest, thus giving the user instantaneous information with which to make financial decisions.

Although aviation objects and propeller objects are depicted in FIGS. 3A–3C, those of ordinary skill in the computer animation arts will appreciate that animated objects of any conceivable type or nature may be used to represent data, the only limits being imagination, and perhaps, computer animation technology. In addition, animated objects of varying types and representing unrelated data may also be displayed simultaneously. Either components of the animated object may be altered to reflect the changes in represented data, e.g., the propeller 30 of the propeller object 39, or the entire animated object itself, e.g., airplane 50A. Those of ordinary skill in the art will also appreciate that aspects other than the movement of the animated object may be altered in accordance with the present invention and still represent changes in the data represented by the animated object. For example, the size of the animated object may shrink or grow as the percentage change in the data represented shrinks or grows, or the color of the animated object may change as the data represented changes. Again, the only limits to the ways in which the appearance of the animated object may be altered are imagination, and perhaps, computer animation technology.

Figure 4:
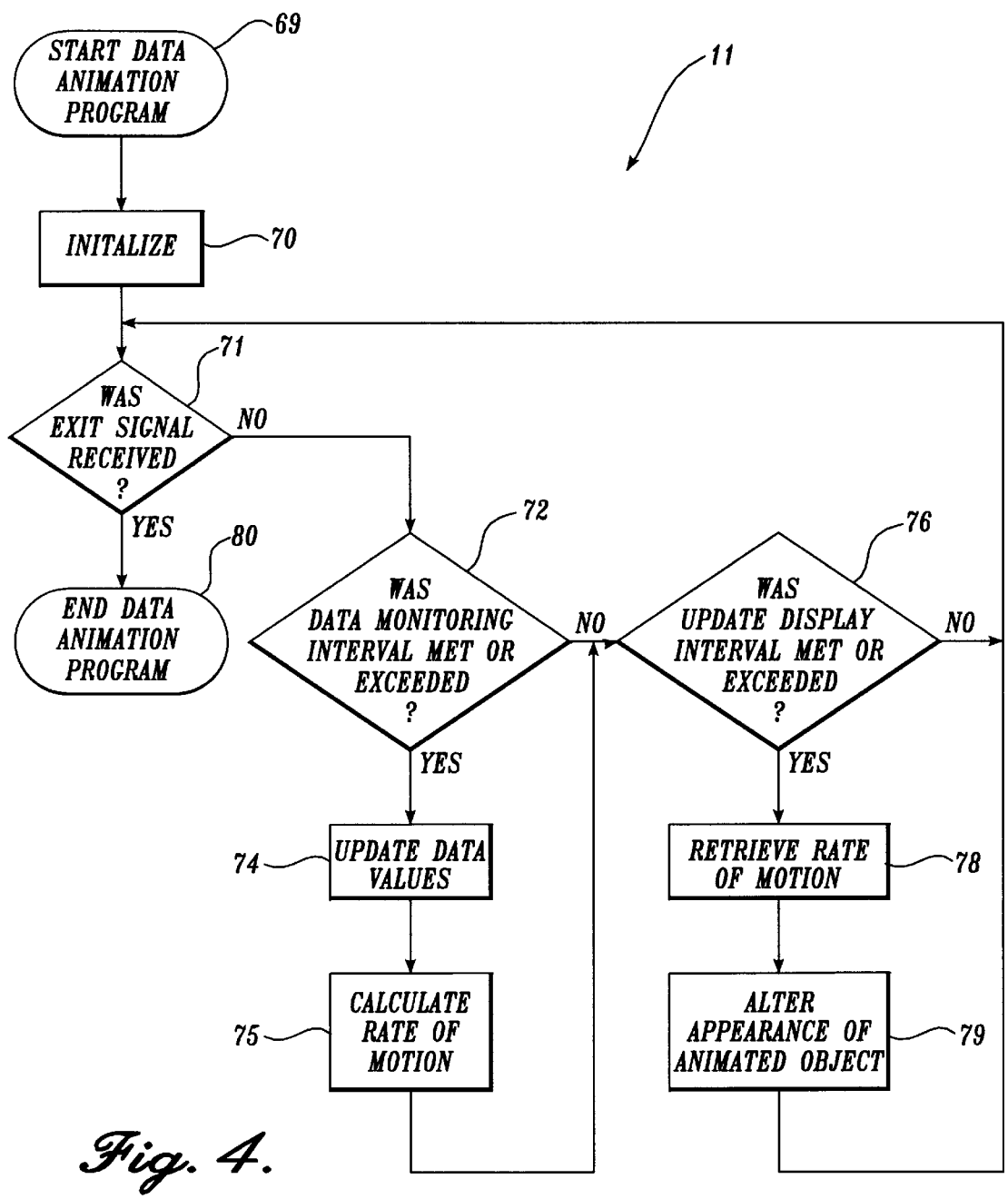
FIG. 4 is a flow diagram illustrating the logic used by the server to alter the appearance of an animated object.

FIG. 4 is a flow diagram depicting the overall logic used by the data animation program 11 to alter the appearance of an animated object as described above. Since several types of data may be monitored and graphically depicted by an animated object simultaneously, it will be appreciated that the logic shown in FIG. 4 is simply repeated for each animated object.

The logic begins in FIG. 4 in a block 69 and proceeds to block 70. In block 70, an initialization routine 70 is performed which initializes the default values used by the data animation program 11 to display the animated object for the first time. As will be discussed in more detail below, after the default values are initialized, the data animation program 11 continuously processes data received from the data source 20 and alters the appearance of the animated object accordingly. Processing continues until an exit signal, e.g., a system interrupt, a user command, etc. is received.

Figure 5:
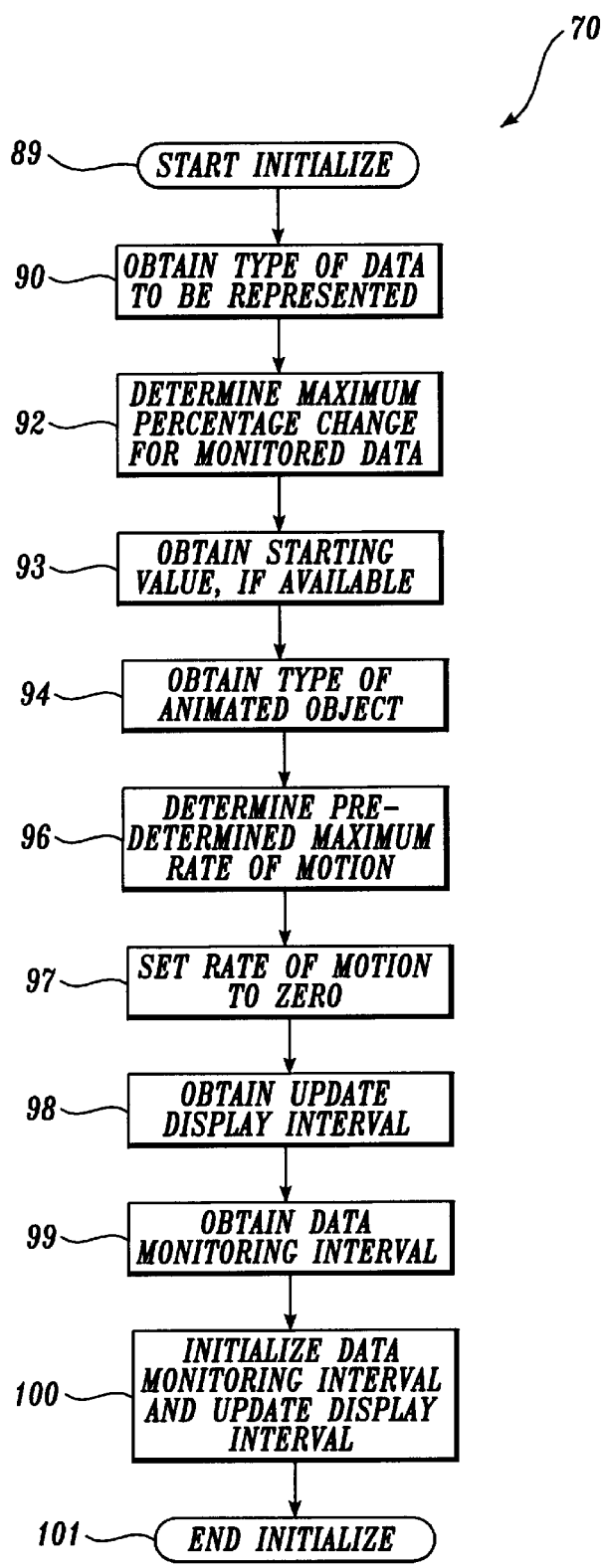
FIG. 5 is a flow diagram illustrating the logic used by the server to initialize the data represented by the animated object.

Returning to block 70, FIG. 5 depicts the initialization routine 70 performed by the data animation program 11 in more detail. The logic begins in a block 89 and proceeds to a block 90 where a default type of data to be represented by the animated object is obtained by the data animation program 11. In one embodiment of the present invention, the type of data to be represented is predefined as stock price data for a particular publicly traded stock. In other embodiments of the present invention, the data animation program 11 prompts a user of the client computer 13 for the type of data to be represented. For example, if the data source 20 provides stock market data for all publicly traded stocks on the NYSE, the user may elect which stock is to be represented. In yet other embodiments of the present invention, the user of the server 10 can define a list of data types from which the user of the client 13 may choose, or the user of the client 13 can select or input the type of represented data directly.

After the type of data to be represented by an animated object has been established, an appropriate maximum percentage change for the type of data being represented is determined in a block 92. This maximum percentage change may be embedded in or automatically assigned by the data animation program 11, retrieved from the data source 20, or entered by a user of the client 13 or server 10. In one embodiment of the invention, the maximum percentage change in data is embedded in the data animation program 11. In another embodiment, the maximum percentage change in data is derived from historical performance of the data. Using the stock market example, the maximum percentage change in value for an index might be +or −3% per day, whereas the maximum percentage change in the price of an individual stock might be +or −10% per day. Accordingly, the data animation program will automatically set the maximum percentage change in the data to the highest historical value obtained during a given time period.

Once the maximum percentage change for the data is determined in block 92, a starting value for the monitored data must be obtained in a block 93. The starting value may be obtained in several ways. It may be predetermined based on the type of represented data. For example, the temperature for a human being defaults to a starting value of 98.6. The starting value may also be predetermined by obtaining the starting value from the data source 20. For example, the starting value for an individual stock may be the opening price of a stock on the NYSE. The starting value could also be determined by entry of a starting value by a user of either the client 13 or server 10. Finally, it is also possible in some embodiments of the present invention that a starting value may not be available during initialization of the data animation program 11. If so, then the starting value eventually will be set to a first value received from the data source 20, as will be described in more detail below.

Once the starting value for the data has been obtained, a type of animated object to be displayed representing the data is obtained in a block 94. In one actual embodiment of the invention, the animated object to be displayed is selected by the user from a choice of various animated objects. In yet other embodiments of the present invention, the animated object is predefined by the data animation program 11. In the embodiment of the present invention shown in FIGS. 3A and 3B, the animated object is an animated propeller object 39, which indicates the rate at which the price of a particular stock(s) is changing. Although animated propeller and aviation objects are used in the illustrated embodiments herein, those of ordinary skill in the art of computer animation will appreciate that animated objects of virtually any conceivable type, size, color, design, etc. may be used without departing from the spirit and scope of the present invention.

Once the default animated object is obtained in block 94, a predetermined maximum rate of motion for the animated object is determined in a block 96. For example, if the animated object selected is a propeller object 39 as illustrated in FIG. 3A, wherein the change in stock price is represented by a propeller rotating about a central axis, then the maximum rate of motion will be the maximum pleasantly visible rotational speed of the propeller about its axis. This rate of motion is expressed in revolutions per minute (RPMs), e.g., 60 RPMs. If the type of animated object selected represents the rate of change in a linear fashion, such as an aviation object moving horizontally across the screen as shown in FIG. 3C, then the maximum rate of motion will be expressed in terms of screen passes, e.g., 30 screen passes per minute. Therefore, the rate of motion determined in block 96 depends upon the type of animated object displayed and the manner in which the change in data is graphically represented by the animated object, e.g., rotationally, linearly, etc.

Once the maximum rate of motion for the animated object has been determined, the current rate of motion for the animated object representing the data is set to a default value of zero in a block 97. Referring back to FIG. 4, it is conceivable that the data monitoring interval has not been met or exceeded in decision block 72, but that the update display interval has been met or exceeded in decision block 76. If this situation occurs, the animated object data will be updated in block 79 prior to the first time that a rate of motion has been calculated in block 75. Initializing the rate of motion to zero in block 97 ensures that the animated object does not move until there is a change in the data value for the data being monitored.

Once the rate of motion of the animated object has been initialized to zero in block 97, an update display interval is obtained at which the client's display 26 is updated to reflect the animated object whose appearance is being altered at the latest rate of motion. In one actual embodiment of the present invention, the update display interval is predefined by the data animation program 11. However, in other embodiments of the present invention, the data animation program 11 may prompt the user for the update display interval so that the client's display is updated at a frequency most desirous to the user.

Once the update display interval has been obtained, a data monitoring interval is obtained in a block 99. As opposed to the update display interval, the data monitoring interval is the interval at which data is obtained from the data source 20. Therefore, it will be appreciated that the data monitoring interval may vary according to the type of data being monitored, e.g., stock prices, temperature, etc., or the desires of the user. For example, if the price of a particular stock is being monitored, the incoming data from the data source 20 providing the stock information may be sampled every ten seconds. As yet another example, if the local outdoor temperature being monitored, the data monitoring interval may be one hour. In one actual embodiment of the present invention, the data monitoring interval is predefined by the data animation program 11. In yet other embodiments, the user is prompted for the interval.

Once the update display and data monitoring intervals are obtained as described above, the intervals are initialized in a block 100, so that the initial data update and the initial display update occur at the proper time. In one actual embodiment of the present invention, the intervals for data monitoring and displaying are initialized as expired so that a full processing cycle of updating data values, calculating the rate of motion, and displaying the animated object (i.e., blocks 74, 75 and 79, respectively, of FIG. 4) occur immediately after the initialization has completed. The initialization routine shown in FIG. 5 then ends in a block 101.

Returning to FIG. 4, after the initialization routine 70 has been performed, the logic proceeds to a decision block 71 and determines whether an exit signal (e.g., a system interrupt, user command, etc.) has been received. If so, the data animation program 11 ends in a block 80. Otherwise, the data animation program 11 proceeds to a decision block 72 in which it determines whether the data monitoring interval has been met or exceeded. If it has, then it is necessary to update the data values being monitored from the data source 20 and the logic thus proceeds to a block 74. On the other hand, if the data monitoring interval has not been met or exceeded, the monitored data values need not be updated. Accordingly, the logic proceeds to blocks 76 through 79, in which the appearance of the animated object is altered, if appropriate.

Returning to decision block 72, if the data monitoring interval has expired, the data values being monitored and graphically represented by the animated object are updated in block 74. The logic used to update the data values is shown in more detail in FIG. 6. The logic begins in FIG. 6 in a block 102 and proceeds to a block 103 in which the most recent value for the monitored data is obtained from the data source 20. As noted above, the data source 20 can take virtually any form. For example, it may be a heat sensor, a satellite link, or a stock reporting service connected via the Internet. In the actual embodiment of the present invention illustrated in FIGS. 3A, 3B, and 3C, updated stock prices are obtained from the NYSE via a satellite link. In addition, the manner in which updated data is obtained may vary. For example, the data source 20 may be polled for the updated data upon expiration of the data update interval or the data source may transfer the updated data every time the data is changed or at specific time intervals. Regardless, once the data monitoring interval expires and the updated data value is obtained, it is stored as the current value for the data in a block 104.

Next, in a decision block 106, the logic determines if there already exists a starting value for the monitored data. As discussed above in connection with the block 93 of FIG. 5, the starting value of the monitored data may be initially obtained during initialization of the data animation program 11. If so, the result of decision block 106 is positive and the logic immediately proceeds to a block 108 where the data monitoring interval is reset.

On the other hand, if a starting value for the monitored data was not obtained during initialization, i.e., there is not yet a starting value for the monitored data, the logic proceeds from decision block 106 to a block 114 where the current value for the data is also stored as the starting value. The logic then proceeds to block 108 in which the data monitoring interval is reset. The logic for updating the data values being monitored ends in a block 110.

Figure 6:
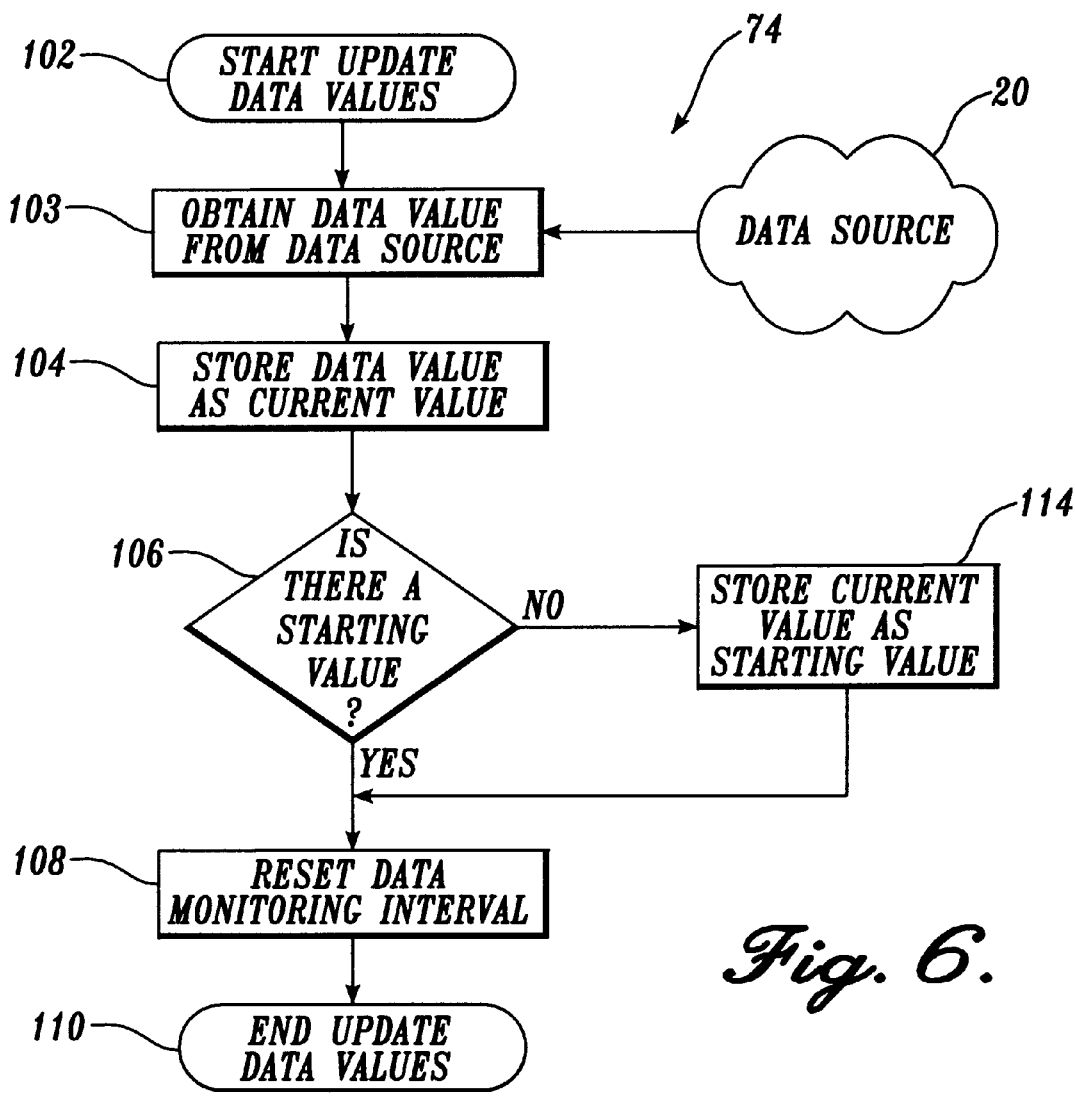
FIG. 6 is a flow diagram illustrating the logic used by the server to update the data represented by the animated object.

Since the data monitoring interval is reset in block 108, it will be appreciated that the update data value routine 74 shown in FIG. 6 will be repeated continuously upon the expiration of each data monitoring interval, so that the current value of the monitored data is continuously updated. However, it will be appreciated that block 114 in FIG. 6 will only be performed once, and only if the starting value of the monitored data was not obtained during the initialization routine 70.

Figure 7:
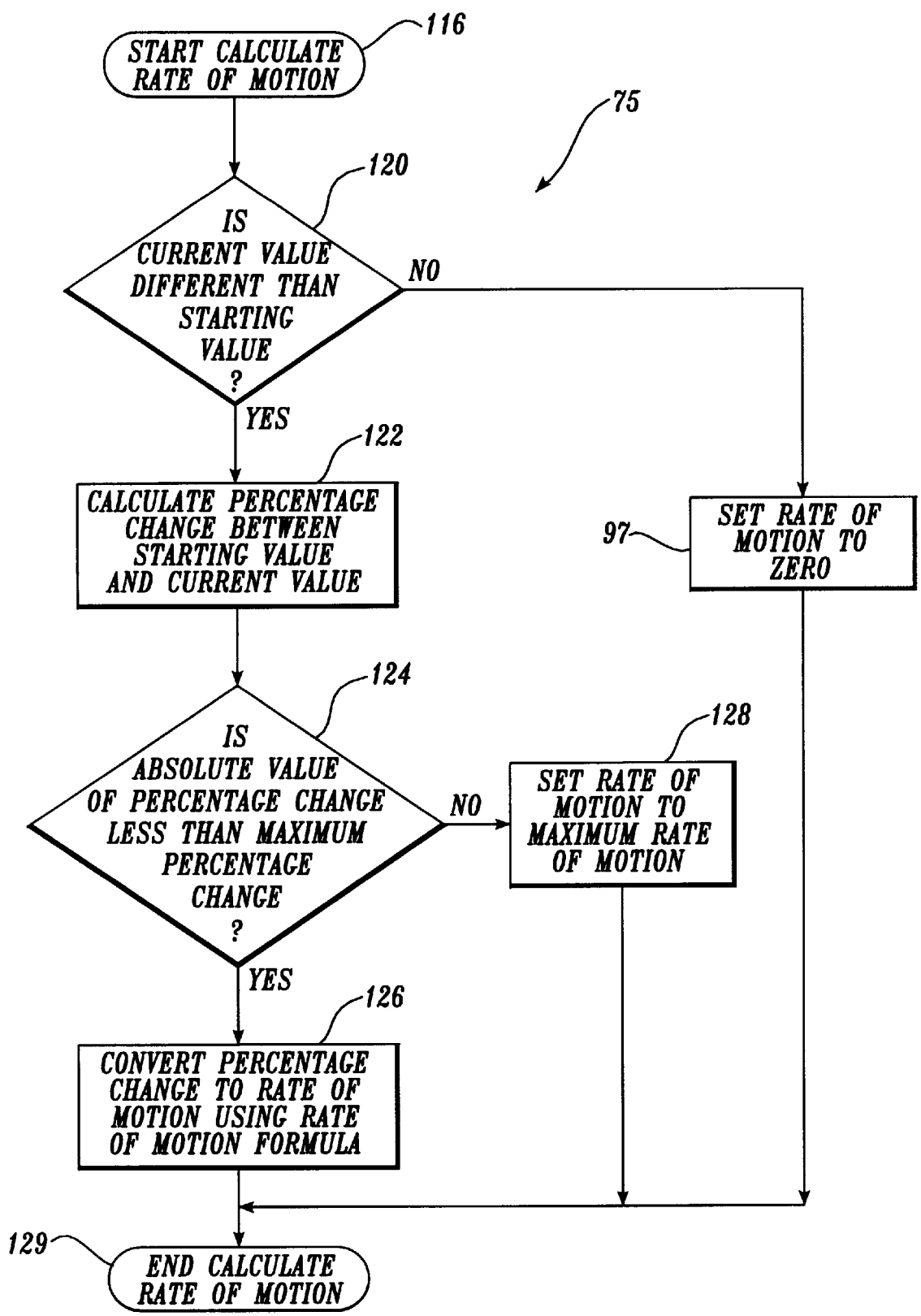
FIG. 7 is a flow diagram illustrating the logic used by the server to calculate the rate of motion of the animated object.

Returning to FIG. 4, once the monitored data value is updated in block 74 as described above, the rate of motion for the animated object is determined in a block 75. The logic used to calculate the rate of motion is shown in more detail in FIG. 7. The logic begins in a block 116 and proceeds to a decision block 120 in which it determines if the current value of the monitored data is different than the starting value. If not, and the values are equal, the rate of motion for the animated object is set to zero in a block 97. It will be appreciated that if the rate of motion is equal to zero, the animated object remains in a fixed position indicating that the monitored data will remain unchanged until a current value is received which is different than the starting value.

If the current value is not equal to the starting value, then the percentage change in data between the starting value and the current value is calculated in a block 122. The percentage change between the starting value and the current value is computed by subtracting the starting value from the current value and dividing the difference by the starting value in accordance with the following equation:

$$(\text{Current Value} - \text{Starting Value}) \div \text{Starting Value} \qquad (1)$$

For example, if the starting value is 1.00 and the current value is 1.05, then the percentage change is +5%, similarly if the starting value is 1.00 and the current value is 0.90, then the percentage change is −10%.

Next, in a decision block 124, if the absolute value of the percentage change in data is equal to or greater than the maximum percentage change in data determined during initialization 70, then the rate of motion for the animated object is set in a block 128 to the maximum rate of motion for the animated object which was also determined during initialization. As will be described in more detail below, the appearance of the animated object will be altered accordingly to indicate that the maximum percentage change in data which it represents has been exceeded. However, if the absolute value of the percentage change is less than the maximum percentage change calculated in block 122, then a new rate of motion for the animated object is calculated in a block 126 using a rate of motion formula, which is described below.

The rate of motion formula used to convert the percentage change in data to the appropriate rate of motion depends on the type of animated object. In general terms, the rate of motion is computed by multiplying the percentage change in data represented by the animated object by a rate of motion conversion factor in accordance with the following formula:

$$\text{Percent Change in Data} \times \text{Rate of Motion Conversation Factor} \qquad (2)$$

The rate of motion conversion factor is expressed by the following equation as the maximum rate of motion for the animated object divided by the maximum percentage change for the data being monitored:

$$\text{Maximum Rate of Motion} \div \text{Maximum Percentage Change} \qquad (3)$$

Thus, the rate of motion conversion factor depends on the type of animated object representing the data and the type of data being monitored. For example, an animated object which revolves or rotates produces a rate of motion expressed in RPMs. In the actual embodiment of the present invention illustrated in FIG. 3A, if the maximum percentage change for a particular stock is +or −10% per day, and the propeller of the animated propeller object has a maximum rate of motion equal to 60 RPMs, then the rate of motion conversion factor is 6, i.e., 60÷10. Consequently, using the rate of motion formula, the rate of motion of the propeller is calculated by multiplying the percentage change by the rate of motion conversion factor, i.e., using a rate of motion conversion factor of 6 and a percentage change of +5% , the calculated rate of motion is 30 RPMs.

In yet another embodiment of the present invention shown in FIG. 3C, the animated object is an aviation object 50A, 50B, 50C, 50D or 50E, which graphically represents a change in monitored data in a linear fashion. Consequently, the units of output are expressed in screen passes instead of RPMs. Accordingly, if the maximum rate of motion for the aviation object is 30 screen passes per minute and the maximum change in data is 10%, the rate of motion conversion factor is 3, i.e., 30÷10. Using the rate of motion formula set forth above, and a 5% change in data, the calculated rate of motion is 15 screen passes per minute.

Once the rate of motion has been computed in block 126 or set in blocks 97 or 128, the value is stored in mass memory 14 of the server 13. The logic for calculating the rate of motion then ends in a block 129.

Returning to FIG. 4, once the rate of motion for the animated object has been calculated or if the data monitoring interval has not yet been met or exceeded, the logic proceeds to a decision block 76 in which it determines if the update display interval has been met or exceeded. If not, it is not yet necessary to alter the appearance and update the display of the animated object. Accordingly, the logic returns to decision block 71 to determine if an exit signal has yet been received.

However, if the update display interval has been met or exceeded, then it is necessary to alter the appearance of the animated object in accordance with the newly calculated rate of motion for the object. Thus, in a block 78, the rate of motion calculated after the expiration of the last data monitoring interval is retrieved from mass memory 14 of the server 10. Next, in a block 79, the appearance of the animated object representing the monitored data is altered accordingly.

Figure 8:
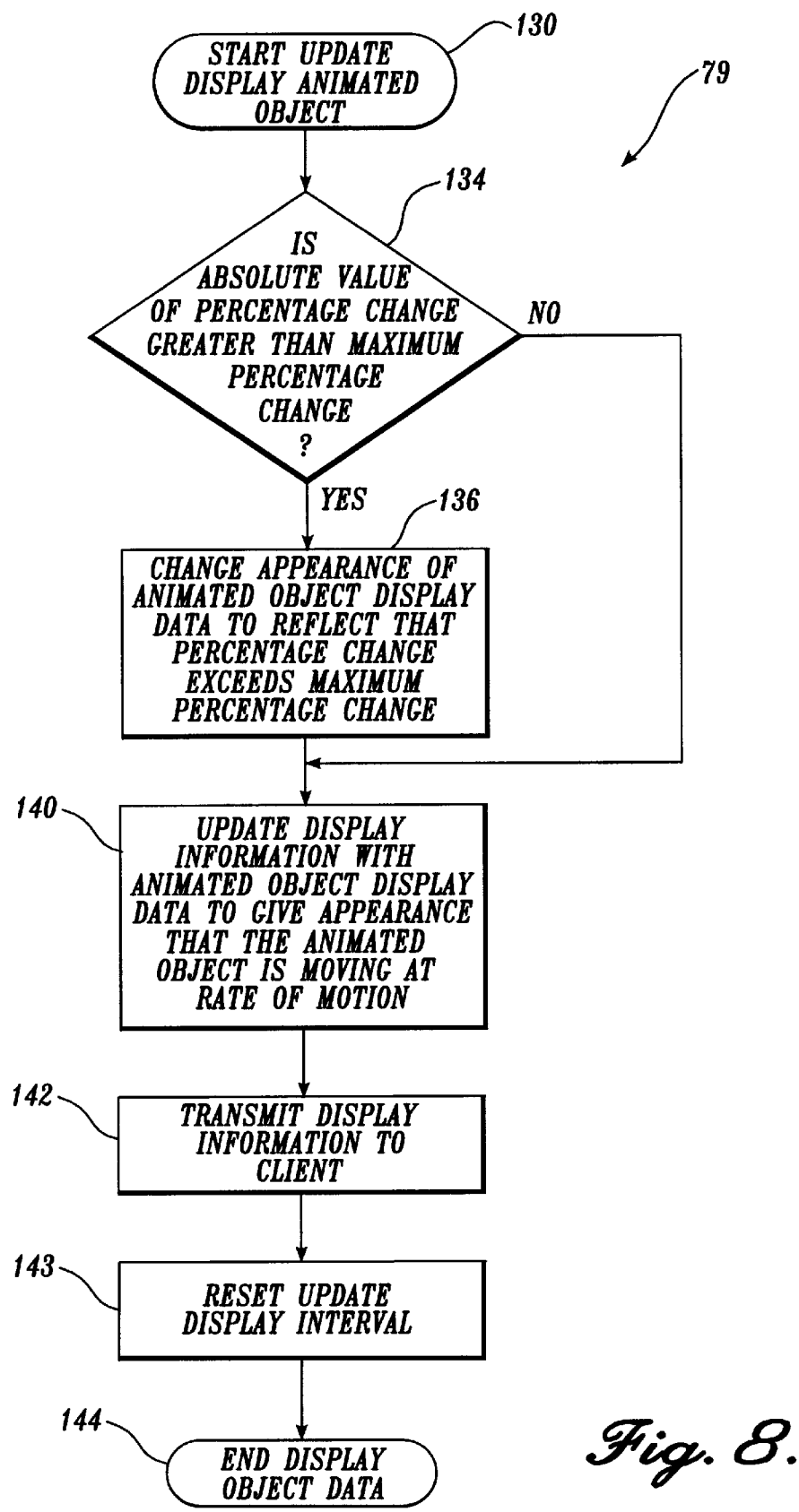
FIG. 8 is a flow diagram illustrating the logic used by the server to alter the appearance of the animated object.

The logic used to alter the appearance of the animated object is shown in more detail in FIG. 8. The logic begins in a block 130 and proceeds to a decision block 134, where the logic determines if the percentage change in data represented by the animated object and calculated in block 122 of FIG. 7 exceeds the maximum percentage change in data set during initialization 30. If it does, then the appearance of the animated object is altered in a block 136 in a manner which makes it obvious that the maximum percentage change has been exceeded. For example, the animated object may be made to change color, change shape, blink, flash, etc. In addition to, or perhaps in lieu of, changing the animated object, the background display may also be altered to indicate that the maximum percentage change has been exceeded. In yet other embodiments, a simple error message is displayed. Those of ordinary skill in the computer animation arts will appreciate that the animated object and/or the background may be altered in any one or in a combination of a myriad of ways so as to indicate to the user that the maximum percentage change has been exceeded.

Returning to decision block 134, if the absolute value of the percentage change in data is less than or equal to the maximum allowed, there is no need to alter the animated object as described above. Instead, the logic proceeds immediately to a block 140, in which the appearance of the animated object is altered so that the animated object appears to move at the calculated rate of motion. As noted above, different animated objects move in different manners. For example, in the animated propeller object, the propeller rotates around a center-axis. As yet another example of an animated object whose rate of motion may be expressed in RPMs, a race track animated object may include a horse which revolves around a track. Such animated objects which revolve around a center-point may revolve in different shaped orbits, such as circular, oval, square or rectangular, but their rate of motion may still be expressed in RPMs.

Animated objects may also move in a linear fashion and have a rate of motion expressed in screen passes per minute, i.e., each time the animated object moves from screen entry to screen exit, one screen pass is counted, as shown in FIG. 3C. Animated objects which move in a linear fashion may move either across the display horizontally or vertically. For example, the aviation objects 50A–50E depicted in FIG. 3C move from one side of the display or screen to the other, and then wrap around. Since the percentage change of a monitored data value may be either positive or negative, the corresponding rate of motion for such an animated may be either a positive or negative value. Therefore, a linear animated object may move in a backwards direction, as well as in a forward direction, or up and down. A variation of the standard screen pass described above is the background screen pass in which both the animated object and the corresponding background are animated so that the main illusion of linear movement is created by the apparent movement of the background, while the animated object remains relatively stationary, moving only slightly to enhance the illusion of speed and changing the direction it is pointing in order to illustrate the direction of movement (e.g., plus or minus, forward or backward, up or down). As noted above, it is a description of the dynamic alteration in appearance of the animated object that is necessary for understanding of the present invention, not exactly how this appearance is created using computer or other animation techniques, which are well-known in the art. Consequently, the animation techniques, including computer animation techniques, used to alter animated objects in accordance with the present invention need not be described in further detail herein.

In the actual embodiment of the present invention illustrated herein, the animated object is transmitted once it is altered by the server 10 in a block 142 to the appropriate client 13 that requested the animated object. In other words, the server 10 generates the program code necessary for altering the animated object in accordance with the determined rate of motion and stores the information to a file. That file is then transferred to the client 13. Once received, the animated object is displayed on the client's display 26. In another actual embodiment of the present invention, the server 10 does not transfer the updated animated object to the client 13 for display. Rather, the server displays the animated object itself and alters the appearance of it as described above. Next, the logic proceeds to a block 143 in which the update display interval is reset. The logic then ends in a block 144.

While the preferred embodiment of the invention has been illustrated and described, it will be appreciated that various changes can be made therein without departing from the spirit and scope of the invention. For example, the order of the initialization functions performed in FIG. 5 may be altered as long as any subsequent functions which are dependent on data are performed after the initialization of the data on which they depend. In addition, as noted above, animated objects of any conceivable type or nature may be used to represent data and the appearance of these animated objects may be altered in any conceivable manner to represent changes in the data. In this regard, aspects of the animated object other than movement may be altered in order to represent a change in the data. Consequently, a rate at which the animated object is altered may be referred to as a "rate of alteration," rather than a "rate of motion," and may be expressed as a defined unit per time interval change, e.g., colors/second, blinks per minute, etc.

The embodiments of the invention in which an exclusive property or privilege is claimed are defined as follows:

1. A method for altering the appearance of an animated object, the animated object graphically representing data, the method comprising:
    (a) determining a percentage change in the data represented by the animated object;
    (b) converting the percentage change in the data to a rate of alteration for the animated object; and
    (c) altering the appearance of the animated object in accordance with the rate of alteration for the animated object.

2. The method of claim 1, wherein determining the percentage change in the data comprises:
    (a) obtaining a starting value for the data;
    (b) obtaining a current value for the data; and
    (c) calculating the percentage change in the data as a function of the starting value and the current value for the data.

3. The method of claim 2, wherein determining the percentage change in the data further comprises:
    (a) updating the current value for the data; and
    (b) recalculating the percentage change in data as a function of the starting value of the data and the updated current value of the data.

4. The method of claim 3, wherein the recalculated percentage change in data is converted into a rate of alteration for the animated object and the appearance of the animated object is altered in accordance with the rate of alteration for the animated object.

5. The method of claim 1, wherein converting the percentage change in data to the rate of alteration for the animated object comprises:
    (a) determining a rate of alteration factor as a function of a maximum rate of alteration allowed for the animated object and a maximum percentage change allowed in the data; and
    (b) calculating the rate of alteration for the animated object as a function of the rate of alteration factor and the percentage change in data.

6. The method of claim 5, wherein converting the percentage change in the data into the rate of alteration for the animated object further comprises setting the rate of alteration for the animated object to the maximum rate of alteration if the percentage change in data is greater than the maximum percentage change allowed in the data.

7. The method of claim 5, wherein converting the percentage change in the data into the rate of alteration for the animated object further comprises setting the rate of alteration for the animated object to zero if the percentage change in data is determined to be zero.

8. The method of claim 1, wherein (a), (b) and (c) are repeated for each of a plurality of animated objects.

9. An apparatus for representing data as an animated object and altering the animated object as the data represented by the animated object changes, the apparatus comprising:
    (a) a processing unit; and
    (b) a storage medium coupled to the processing unit, the storage medium storing program code implemented by the processing unit for:
        (i) calculating a percentage change in the data;
        (ii) converting the percentage change in the data to a rate of alteration for the animated object; and
        (iii) altering the animated object in accordance with the rate of alteration for the animated object.

10. The apparatus of claim 9, further comprising a display coupled to the processing unit for displaying the animated object.

11. The apparatus of claim 9, wherein the program code implemented by the processing unit determines the percentage change in the data by:
    (a) obtaining a starting value for the data;
    (b) obtaining a current value for the data; and
    (c) calculating the percentage change in data as a function of the starting value and the current value.

12. The apparatus of claim 11, wherein the program code implemented by the processing unit recalculates the percentage change in data as the data represented by the animated object changes.

13. The apparatus of claim 12, wherein the program code implemented by the processing unit converts the recalculated percentage change in data into a rate of alteration for the animated object.

14. The apparatus of claim 13, wherein the program code implemented by the processing unit periodically alters the animated object in accordance with the recalculated percentage change in data.

15. The apparatus of claim 9, wherein the program code implemented by the processing unit converts the percentage change in data to the rate of alteration for the animated object by:
    (a) establishing a rate of alteration formula based on the percentage change in data, a maximum rate of alteration allowed for the animated object, and a maximum percentage change allowed in data; and
    (b) calculating the rate of alteration for the animated object as a function of the rate of alteration formula.

16. The apparatus of claim 15, wherein the program code implemented by the processing unit alters the animated object in a predetermined manner if the percentage change in data is greater than the maximum percentage change allowed.

17. The apparatus of claim 15, wherein the program code implemented by the processing unit further does not alter the animated object if the percentage change in data is determined to be zero.

18. The apparatus of claim 9, wherein the program code implemented by the processing unit determines a percentage change in data, converts the percentage change in data to a rate of alteration for the animated object, and alters the animated object in accordance with the rate of alteration, for each of a plurality of animated objects.

19. The apparatus of claim 9, further comprising an external interface for communicating the altered animated object to at least one other device for display.

20. A computer-readable medium having a computer-executable component for altering the appearance of an animated object according to changes in data represented by the animated object, wherein the computer-executable component alters the appearance of an animated object by:
   (a) determining a rate of alteration for the animated object based on a change in data represented by the animated object; and
   (b) altering the appearance of the animated object in accordance with the rate of alteration for the animated object.

21. The computer-readable medium of claim 20, wherein the computer-executable component determines the rate of alteration for the animated object by:
   (a) determining a percentage change in data represented by the animated object;
   (b) determining a rate of alteration factor as a function of a maximum rate of alteration allowed for the animated object and a maximum percentage change allowed in data; and
   (c) calculating the rate of alteration for the animated object as a function of the rate of alteration factor and the percentage change in data.

22. The computer-readable medium of claim 21, wherein the computer-executable component determines the percentage change in data represented by the animated object by:
   (a) obtaining a starting value for the data;
   (b) obtaining a current value for the data; and
   (c) calculating the percentage change in data as a function of the starting value and the current value.

23. The computer-readable medium of claim 21, wherein the computer-executable component sets the rate of alteration for the animated object to zero if the percentage change in data is determined to be zero.

24. The computer-readable medium of claim 23, wherein the computer-executable component continues does not alter the appearance of the animated object, if the percentage change in data is determined to be zero.

25. The computer-readable medium of claim 21, wherein the computer-executable component sets the rate of alteration for the animated object to the maximum rate of alteration if the percentage change in data is greater than the maximum percentage change in the data allowed.

26. The computer-readable medium of claim 25, wherein if the rate of alteration for the animated object is set to the maximum rate of alteration, the computer-executable component alters the appearance of the animated object to indicate that the maximum percentage change in data allowed has been exceeded.

27. The computer-readable medium of claim 21, wherein after expiration of an update interval, the computer-executable component redetermines the percentage change in the data represented by the object, redetermines the rate of alteration factor and recalculates the rate of alteration for the animated object.

28. The computer-readable medium of claim 20, wherein after expiration of a display interval, the computer-executable component updates the rate of alteration for the animated object and alters the appearance of the animated object with the updated rate of alteration.

29. The computer-readable medium of claim 20, wherein the computer-executable component determines a rate of alteration for each of a plurality of animated objects based on a change in data represented by each animated object and alters the appearance of each of the plurality of animated objects in accordance with the rate of alteration for each animated object.

* * * * *